United States Patent [19]
Yaniv

[11] Patent Number: 5,631,045
[45] Date of Patent: May 20, 1997

[54] POLYMER COATED POWDERS

[75] Inventor: Itzhak Yaniv, Haifa, Israel

[73] Assignee: Baran Advanced Materials (94) Ltd., Haifa, Israel

[21] Appl. No.: 536,972

[22] Filed: Sep. 29, 1995

[30] Foreign Application Priority Data

Sep. 28, 1995 [IL] Israel ......................... 115450

[51] Int. Cl.$^6$ ..................................... B05D 1/36
[52] U.S. Cl. ........................... 427/221; 427/340
[58] Field of Search .................. 427/212, 215, 427/220, 221, 337, 340, 213.3, 213.31

[56] References Cited

U.S. PATENT DOCUMENTS

| | | | |
|---|---|---|---|
| 3,330,693 | 7/1967 | Rumberger | 117/161 |
| 3,503,785 | 3/1970 | Kruse | 117/62.2 |
| 3,661,620 | 5/1972 | Dekking et al. | 117/62.2 |
| 3,969,547 | 7/1976 | Isawa et al. | 427/214 |
| 4,017,452 | 4/1977 | Schwarz | 260/42.14 |
| 4,395,485 | 7/1983 | Kashiwagi et al. | 430/903 |
| 4,800,103 | 1/1989 | Jeffs | 427/221 |
| 5,049,594 | 9/1991 | Jeffs | 427/221 |

FOREIGN PATENT DOCUMENTS

| | | |
|---|---|---|
| 2135788 | 1/1995 | Canada. |
| 0276179B1 | 12/1991 | European Pat. Off.. |
| 113283 | 5/1995 | Israel. |
| 114853 | 6/1995 | Israel. |

OTHER PUBLICATIONS

Kalisky, O. et al, "Magnesium Hydroxide—Flame Retardant (NHFR) for Plastics and Rubber", CHIMICA OGG/Chemistry Today, (Jun. 1995).

Pryor, E.J., "Mineral Processing", Elsevier Pub Vo Ltd., Amsterdam, 1965 pp. 458–471. No Month Given.

Reverte i Vidal, J., "CaCO$_3$ Fillers, Market Trends and Developments", Industrial Minerals, pp. 63–65, (Nov. 1994).

O'Driscoll, M., "Plastic Compounding, Where Mineral Meets Polymer", Industrial Minerals, pp. 35–43, (Dec. 1994).

Goodman, R., "Surface Modification of Mineral Fillers", Industrial Minerals, pp. 49–55 (Feb. 1995).

Primary Examiner—Katherine A. Bareford
Assistant Examiner—Erma Cameron
Attorney, Agent, or Firm—Mark M. Friedman

[57] ABSTRACT

A process for coating a solid with a water-insoluble or slightly water-soluble coating material consisting essentially of a high-viscosity polymer and/or wax and/or grease, or mixtures thereof, comprises dissolving the said coating material in one or more solvent materials selected from among carboxylic acids, carboxylic acid anhydrides, carboxylic acid halides and/or mixtures thereof, to form a low-viscosity "polymer solution", contacting the solid to be coated with the said "polymer solution", and thereafter chemically or physically modifying the "polymer solution" to cause the formation of a coating of increased viscosity.

18 Claims, No Drawings

POLYMER COATED POWDERS

FIELD OF THE INVENTION

The present invention relates to a novel process for coating inorganic and organic solids with polymers, waxes and greases, at a temperature lower than the softening temperature of the original raw materials that constitute the coating. This process is particularly important for the preparation of surface coated powders of inorganic materials such as Al, Cu, $MgO.3MgO.4SiO_2.H_2O$, $Mg(OH)_2$, $CaCO_3$, $CaMg(CO_3)_2$, $MgCO_3$, $Ca(OH)_2$, $Al_2O_3$, $SiO_2$, $CaSO_4$, $Al(OH)_3$, glass fibers, alumina fibers, whiskers and platelets, SiC fibers, whiskers and platelets, TiN fibers and whiskers, other ceramic powders, and mixtures thereof. Also, it is an important process for the preparation of surface coated fertilizers, to prevent their caking and/or turn them into slow release fertilizers such as $KNO_3$, KCl, $(NH_4)_2SO_4$, $K_2SO_4$, $(NH_4)H_2PO_4$, $(NH_4)_2HPO_4$, urea, etc. and mixtures thereof.

The present invention relates to a method for the production and uses of materials coated with polymers, waxes or greases. The invention makes it possible to produce powders of improved performance and compatibility with a variety of other materials, namely, minerals, plastics and cellulose, and lowers the cost of their production. This invention makes it also possible to glue two or more different materials together in an unconventional and inexpensive manner.

The present invention is particularly important, inter alia, in the fertilizers industry and in the production of powders for the cement (construction) industry, for the paper industry, for the cosmetics industry, for the adhesives industry, for the paint industry, for the ceramic industry, for the plastic and rubber industries, etc.

BACKGROUND OF THE INVENTION

Application of Surface-Modified Powders

The literature is replete with patents, articles, reviews and books concerning the production and beneficiation of minerals (e.g. "Mineral Processing"; E. J. Pryor; Elsevier Publishing; Third Ed.; 1965) and their uses, especially after surface modifications, in the plastics compounding, in the paper industry, in the ceramic industry, in the paint industry, etc. (e.g. "$CaCO_3$ Fillers—Market Trends and Developments"; J. Reverte i Vidal; Industrial Minerals; November 1994, "Plastic Compounding—Where Mineral Meets Polymer"; M. O'Driscoll; Industrial Minerals; December 1994, "Surface Modification of Mineral Fillers"; R. Goodman; Industrial Minerals; February 1995, "Magnesium Hydroxide Flame Retardant (NHFR) for Plastics and Rubber"; O. Kalisky et al; Chimica Oggi/Chemistry Today; June 1995 and references therein). The above reviews illustrate the importance of the physical properties, and especially the surface characteristics, of fine powders that are used in a large variety of applications.

Size Reduction

Powders are intensively used in numerous applications, e.g. fillers and flame retardants in the paper and in the plastics industries, as raw materials for ceramics and cements, as constituents in cosmetics, etc.. In order to make effective use of powders, their particle size distribution should be controlled, usually reduced, and their surface properties should be compatible with those of the substrates with which these powders are to be used.

Grinding or milling of materials are common technologies for size reduction. However, they require the expenditure of high energies, especially in the sub-micron range, at which the high surface area of the particles increases the rate of their coalescence. The high cost of such operations is increased by their low productivity and by the requirement for equipment made of special materials that withstand the high attrition and minimize the contamination of the final fine powders. Generally, two processes are used in the art—dry and wet grinding/milling. In order to increase the production rates of both types of processes and to afford better qualities of grinding/milling, aids, such as dispersants like sodium hexametaphosphate, etc., are usually employed.

Another approach for obtaining fine powders involves their controlled recrystallization or precipitation by reacting suitable reactants.

In the cases described above, it is of great importance that any slurry of fine powders be stable, namely, that the fine particles will not undergo coalescence and the solids will not separate or precipitate even after long periods of time. Also, it is required that the final dry fine powders be free flowing. This can be achieved, among other methods, by coating the fine particles with polymers, waxes or greases. However, the softening temperatures of good coating materials are usually quite high, in order to avoid their displacement on storage or under regular use. Therefore, it is desired to use coating materials that are of low viscosity at relatively low temperatures, at which they are applied, but after their application, it is desirable that their viscosity be much higher. Moreover, it is desired that the coating will be attracted specifically to the surfaces that are to be coated, prior to their curing process.

A recent Israeli patent application, IL 113283, filed Apr. 6, 1995, by the same applicant herein, the description of which is incorporated herein by reference, discloses the use of certain carboxylic acid salts to improve the production of fine powders.

Another recent patent application, IL 114853, filed Aug. 7, 1995, by the same applicant herein, the description of which is incorporated herein by reference, discloses a novel method for modifying the surface charges of inorganic powders. The literature review in this patent application is also pertinent to the present invention.

Glass Fibers

Glass fibers are used extensively in reinforcing materials. However, their successful application is dependent on the ability to modify their surface properties and to transform the fibers into materials compatible with their surroundings. This is especially true when the glass fibers are to be applied in plastics as well as in cements. For instance, any attempt to use glass fibers to reinforce portland cement is doomed to fail, as the alkaline cements attack the glass and degrade the product (cf—"Durability of E-Glass Fibre Reinforced Composites with Different Cement Matrices"; by K. Kolver and A. Bentur of the National Building Research Institute; the Technion—Israel Institute of Technology; Haifa; Israel and I. Odler of the Institute of Non-Metallic Materials; the Technical University-Clausthal; Clausthal; Germany).

Naturally, the problem raised above can be solved by a variety of methods, including those described in the article of K. Kolver et al, but the prior art is unable to furnish a simple, inexpensive and readily operable solution. Similar problems are encountered when using other reinforcing materials like fibers, whiskers and platelets of MgO, $Al_2O_3$, SiC, TiN, etc.

Metal Powders

Metal powders are being used quite extensively in the plastics industry. However, their surfaces are not compatible with the hydrophobic plastics in which they are to be evenly distributed. Preparation of master batches of surface modified metallic powders by simply mixing the fine particles with melted polymers, waxes or greases has its drawbacks. These coatings should eventually exhibit high viscosity at the temperatures at which the metallic powders will be stored prior to their use, otherwise the coating will undergo dislocation or the fine particles will coalesce.

The quality of the coating adherence to the metallic surfaces is another problem that should be taken care of, while using simple and inexpensive methods and apparatus. The prior art uses powerful high shear mixers at elevated temperatures to obtain the desired products. However, this method is still quite limited to polymers of relatively low viscosity, it requires the use of heated equipment and it does not lead to sufficient adherence of the coating to the metal powders. Another approach to solving this problem is to increase the degree of polymerization of the coating while applying it on the desired surfaces. This approach is quite sophisticated and requires a very strict synchronization of the different steps in the process.

Slow Release Fertilizers

Recently, a patent application for a new production method of slow release fertilizers was filed by the present inventor (U.S. patent application Ser. No. 08/331,324, filed Oct. 28, 1994), in which improved magnesite cements were used. This patent application also refers to publications that review the prior art of this technology of forming water soluble fertilizers coated with water insoluble materials.

Generally, such fertilizers are coated with, at least, two different layers as is manifested in EP 0276179, in which carboxylate salts are coated, in situ, on the respective fertilizers. Thereafter, a wax is coated onto the first layer. This second layer should either be applied at elevated temperatures, or the wax should be of a low melting range. This problem is particularly important when urea is to be turned into a slow-release fertilizer, since its low melting point does not allow the use of high melting waxes and, therefore, the second layer may lead to coalescence of the urea granules on storage under the harsh conditions at the storehouses and fields of the farms.

It is quite clear that the use of a wax of a low viscosity at a relatively low temperature, of the magnitude of the temperature at which the second coating layer is preferably produced, that can be turned later in the process into a high viscosity layer by simple and inexpensive methods, is highly desirable.

$CaCO_3$ Powders

A typical and most important example is the powdered $CaCO_3$. Knowing the surface properties of calcite, and understanding how to modify them in order to improve its performance as a major filler in the plastics and the paper industries, are of prime importance. Efficient processes of surface coating of calcite with suitable polymers, waxes or greases, which may contain other fine powders like $TiO_2$ for improved brightness, Al for improved electrical and heat conduction, are still quite desired.

$Mg(OH)_2$ Powders

This material is used as a flame retarding in plastics and a mild base. It may be produced by the hydrolysis of MgO in water. Performing the hydrolysis under conditions at which the surfaces of the raw material and the product are modified, may enhance the production rate substantially and allow the obtaining of powders that contain mainly single crystals that are already surface coated with fatty acid salts and/or polymers, waxes or greases. Operation of the surface coating of brucite can be done in a similar manner as in the abovementioned case of calcite.

$Al(OH)_3$ Powders

This material is used, among its other uses, as a flame retardant in plastics. It may be produced by the hydrolysis of $Al_2O_3$ in water. Performing the hydrolysis under conditions at which the surfaces of the raw material and the product are modified, may enhance the production rate substantially and allow the obtaining of powders that contain mainly single crystals that are already surface coated with fatty acid salts and/or polymers, waxes or greases. Operation of the surface coating of the $Al(OH)_3$ can be done in a similar manner as in the abovementioned cases of calcite and brucite.

The desire to turn hydrophilic surfaces of powder minerals into hydrophobic ones is general to a great many materials such as $CaMg(CO_3)_2$, $MgCO_3.3MgO.4SiO_2.H_2O$, $Ca(OH)_2$, $CaCO_3$, $Al_2O_3$, $SiO_2$ and $CaSO_4$.

Surprisingly, it was found that the surfaces of organic and inorganic powders (e.g., metals like Al and Cu; natural and artificial minerals like $MgO.3MgO.4SiO_2.H_2O$, $Mg(OH)_2$, $CaCO_3$, $CaMg(CO_3)_2$, $MgCO_3$, $Ca(OH)_2$, $Al_2O_3$, $Al(OH)_3$, $SiO_2$, $CaSO_4$; fibers, whiskers and/or platelets of glass, alumina, MgO, SiC, TiN; fertilizers like $KNO_3$, KCl, $K_2SO_4$, $(NH_4)_2SO_4$, $(NH_4)H_2PO_4$, $(NH_4)_2HPO_4$, urea; organic and inorganic pigments like quinacridones, mineral oxides of iron or copper, etc.) can be coated at relatively low temperatures with "coating solutions", which are liquids or waxy materials of low viscosity, and these coatings can then be turned into hard, high viscose materials by simple chemical or physical interactions.

It is a purpose of the present invention to provide an inexpensive and simple method to produce fine powders, fibers, whiskers, platelets and/or granules that are coated with polymers, waxes or greases of high quality.

It is a further purpose of the invention to provide methods to improve these particles by coating them with suitable carboxylic acid salts and other additives.

It is a further purpose of the invention to provide methods to produce these coated particles using common and inexpensive raw materials and equipment.

It is further purpose of the present invention to demonstrate the uses of these coated particles, which are obtained by this novel coating method.

Other purposes and advantages of the invention will become apparent as the description proceeds.

DETAILED DESCRIPTION OF THE INVENTION

Surprisingly, it has been found that water insoluble or slightly soluble polyolefins like polyethylene (PE), polypropylene (PP), ethylene-acrylic acid copolymers, ethylene-maleic acid copolymers and many others, which are extremely soluble in carboxylic acids at quite low temperatures, namely, at substantially lower temperatures than the softening point of the respective pure polymers, can be spread quite easily and economically, as thin or thick films, onto the surface of solids, especially onto the surface of fine powders. Furthermore, it has been found that these low viscosity liquids can then be turned into high viscosity materials by simply transforming the solvents, the carboxylic acids, into the carboxylate forms by reacting them with suitable bases. Alternatively, the suitable carboxylic acids may be dissolved in an aqueous media leading to the precipitation of the hard polymers onto the desired surfaces.

This invention leads to the following major improvements over the prior art that is associated with coating of the hydrophilic surfaces of many fine powders with hard and adherent hydrophobic thin films of polymers, waxes or greases:

1. Spreading of the polymers can be done with simple mixers rather than with very powerful high shear mixers that are equipped with heating systems, as are required in the prior art.

2. The coating procedure can be carried out under relatively low temperatures, even at ambient temperature, while the polymers that are being used to coat the fine particles can be melted only at much higher temperatures. This allows the choosing of a larger variety of better suited polymers, i.e. with a quite higher softening temperature range, to coat materials of relatively low melting range. For instance, coating of urea granules with Epolene wax E-43 of Eastman Kodak is rather impossible without causing the particles of urea to melt. There is a rather large variety of materials that can, and should, be encapsulated with high melting waxes. However, this cannot be done unless the polymers are emulsified in water, or inert solvents are to be used. These must be recycled at the end of the process with high expenses and may cause the pollution of the environment and the product itself.

3. The precipitation of the polymers, and usually the precipitation of the respective carboxylate salts together with it, can be targeted towards pre-selected surfaces, that were surface-modified in advance according to the technology that is described in the aforementioned patent application (IL 114853), or according to any other suitable technology or surface treatment. This, in turn, may lead to substantial saving of the coating, as a thorough coverage is obtained with less polymers.

The present invention, therefore, relates, inter alia, to a novel process for the coating of polymers, waxes, and greases onto and/or in between inorganic and organic solids at a temperature that is usually much lower than the softening temperature of these original raw materials that constitute the coating.

The process of the invention is particularly important for the preparation of surface coated powders of inorganic materials such as Al, Cu, $MgO.3MgO.4SiO_2.H_2O$, $Mg(OH)_2$, $CaCO_3$, $CaMg(CO_3)_2$, $MgCO_3$, $Ca(OH)_2$, $Al_2O_3$, $SiO_2$, $CaSO_4$, $Al(OH)_3$, fibers, whiskers and/or platelets of glass, alumina, MgO, SiC, TiN, etc. and mixtures thereof. Also, it is an important process for the preparation of surface coated free flowing fertilizers and especially of slow release fertilizers like $KNO_3$, KCl, $(NH_4)_2SO_4$, $K_2SO_4$, $(NH_4)H_2PO_4$, $(NH_4)_2HPO_4$, urea, etc. and mixtures thereof.

The invention, inter alia, relates to a method for the production and uses of materials coated with polymers, waxes or greases. This invention makes it possible to produce powders of improved performance and compatibility with a variety of other materials, namely, minerals, plastics and cellulose, and lowers the cost of the production. This invention makes it also possible to glue two or more different materials together in an unconventional and inexpensive manner.

The present invention is particularly important in the fertilizers industry and in the production of powders for the cement (construction) industry, for the paper industry, for the cosmetics industry, for the adhesive industry, for the paint industry, for the ceramic industry, for the plastic and rubber industries, etc.

DETAILED DESCRIPTION OF PREFERRED EMBODIMENTS

The preparation of the "coating solutions" by mixing suitable polymers with suitable carboxylic acids can be easily done using simple mixers. The dissolution temperature may be below the softening temperature of the respective polymer, wax or grease, near it or above it. Naturally, it is preferred to produce the "coating solutions" at ambient temperature, if that is possible, in order to save the cost of mixers with heating systems. The "coating solutions" may be stored later at a temperature in the liquid state or below its pour point, as a soft paste. Another possibility is to prepare the desired polymers, in situ, by polymerising the respective monomers, dimers and/or oligomers in the carboxylic acid mixtures. A large variety of water insoluble or slightly water-soluble polymers, copolymers, block copolymers, grafted copolymers and mixtures thereof can be used in this invention.

The carboxylic acids may be applied in their acid form and/or their anhydride form and/or their acyl halide form. One should be aware of the fact that the anhydrides may be more reactive than the respective acids in aqueous solutions, at which they be immersed in later applications, while the acyl halides are more reactive and corrosive under certain conditions. Carboxylic acids containing one or more COOH groups may be used. However, the choice of the right acid should be made on a cost/performance basis. The longer the carbon chain of the carboxylic acid, the lower is their solubility in water. The kind of cations that can be used may have a marked effect on the performance of the process and the quality of the final products—the coated objects. For instance, the use of $Ca^+$ and $Mg^{++}$ may give rise to extremely water soluble salts of propionic acid, while these cations lead to salts of palmitic or oleic acids that are slightly soluble in water. Alkali cations may lead to soaps, which in turn may assist in spreading the coating evenly onto the surface of the substrate. However, the choice of which carboxylic acids and/or of which cations to use can not be prescribed. It is worthwhile to note that, sometimes, mixing of various constituents may lead to a better cost/performance.

The carboxylic acids and/or carboxylic acid salts and/or the carboxylic acid anhydrides and/or the acyl halides may or may not have polymerized, in situ, during the production of the coating, or may have partially polymerized, in situ, during the production of the coated powders, and when they have polymerized they may be dimerized and/or oligomerized and/or polymerized in the presence or the absence of any added polymerization initiators. The polymerization initiators, if added, are selected from among organic azo compounds and organic peroxide compounds, such as percarboxylates; inorganic peroxides, such as. hydrogen peroxide, persulfates, percarbonates and perborates.

As mentioned above, the surface of the substrate may be pre-treated in order to target the coating onto the right surfaces and to effect chemical bonds of the coating with these surfaces.

The choice of the more suitable hydrophobic polymers, waxes or grease is within the scope of the skilled person, and in many cases, polymers of high softening temperatures and high viscosity are preferred. In other case modified polymers, grafted with hydrophylic groups, are used to obtain a better binding to the substrate surfaces. Mixtures of polymers can also be used, however, any one skilled in the art may find the optimal choices.

Other additives that are commonly used in the art are chosen from among organic and inorganic colorant and pigments. Of course, other conventional additives can also be added. In a preferred mode of operation, these additives may be pre-mixed with suitable carboxylic acids, with the "coating solutions" and/or with the substrate that is to be coated.

All the above and other characteristics and advantages of the invention will be better understood through the following illustrative and non-limitative description of preferred embodiments.

EXPERIMENTAL DATA

Raw Materials
Carboxylic acids or Fatty Acids
Propionic Acid of Aldrich -FA-1
Caprylic Acid of Aldrich -FA-2
Capric Acid of Aldrich -FA-3
2-Ethylcaproic Acid of Aldrich -FA-4
Tall oil of Arizona Chemical Co. -FA-5
Lauric Acid of Aldrich -FA-6
Palmitic Acid of Aldrich -FA-7
Oleic Acid of Aldrich -FA-8
Valeric Acid of Aldrich -FA-9
Nitrilotriacetic Acid ($NTAH_3$) of Aldrich -FA-10
Phthalic Anhydride of Fluka -FA-11
Maleic Anhydride of Fluka -FA-12
2-Ethylhexanoyl Chloride of Aldrich -FA-13
Polymers, Waxes and Greases
Polyethylene of Allied Signal, Grade 6-A -POL-1
Polyethylene Acrylic Acid Copolymer of Allied Signal, Grade 540-A -POL-2
Polyethylene Grease of Allied Signal, Grade 1702 -POL-3

Potassium Chloride (KCl) of Frutarom
Mono Ammonium Phosphate (MAP) of Aldrich
Triple Super Phosphate (TSP) of of Rotem Fertilizers Ltd
$MgSO_4$ solution having a density of d=1.2 g/cm³ where the ratio $H_2O/MgSO_4$ 3.1
$MgCl_2$ solution having a density of d=1.267–1.27 g/cm³ where the ratio $H_2O/MgCl_2$=2.61
$CaCO_3$ powder ($d_{50}$=5 microns) of Polychrom, Israel—"Girulite-10"
$CaCO_3$ powder ($d_{50}$=18 microns) of Polychrom, Israel—"Girulite-40"
Sodium Silicate Solution (14% NaOH and 27% $SiO_2$) of Fluka
Ferric Chloride ($FeCl_3$) of Riedel-de Haen
Ferrous Sulfate ($FeSO_4 7H_2O$) of Riedel-de Haen
Aluminum (Al) metal powder of Moniplet & Estban S.A., Spain—Grade Panreac/P.R.S Raw materials of high purity are not of prime importance. Commercially available materials can be used.

EXAMPLE 1

Preparation of Coating Solutions in Carboxylic Acid(s) and Anhydrides

A glass beaker equipped with a magnetic stirrer, a heater and a thermometer was used to dissolve polymers, greases and waxes in carboxylic acides and/or carboxylic acid anhydrides. The dissolution was conducted at a temperature range much below the softening temperatures of the corresponding polymers, greases and waxes during up to 30 mins.. Clear and transparent liquids of relatively low viscosity were obtained. Several examples are given in Table 1 below:

TABLE 1

| Test # | Type of Carboxylic Acid | Type of Carboxylic Acid | Type of Polymer | Load of Polymer % (wt) | Temperature °C. |
|---|---|---|---|---|---|
| 1 | Propionic | FA-1 | POL-3 | 30 | 30 |
| 2 | Caprylic | FA-2 | POL-4 | 40 | 30 |
| 3 | Capric | FA-3 | POL-1 | 35 | 40 |
| 4 | 2-Ethylcaproic | FA-4 | POL-4 | 45 | 35 |
| 5 | Valeric | FA-9 | POL-2 | 35 | 40 |
| 6 | Tall Oil | FA-5 | POL-5 | 30 | 25 |
| 7 | Lauric | FA-6 | POL-5 | 30 | 50 |
| 8 | Palmitic | FA-7 | POL-5 | 30 | 70 |
| 9 | Oleic | FA-8 | POL-5 | 60 | 25 |
| 10 | Palmitic | FA-7 | POL-6 | 35 | 70 |
| 11 | Tall Oil | FA-5 | POL-6 | 30 | 50 |
| 12 | Oleic | FA-8 | POL-6 | 30 | 50 |
| 13 | Phthalic Anhyd. | FA-10 | POL-5 | 25 | 140 |
| 14 | Maleic Anhyd. | FA-11 | POL-5 | 25 | 60 |
| 15 | 2-Ethylhexanoyl Chloride | FA-12 | POL-6 | 20 | 60 |

Remarks:
1. Acids, acid anhydrides and also acyl halides.
2. The viscosity of the solutions may increase by e.g. reducing the temperature or by increasing the polymer concentration. Depending on the specific combinations (e.g. polymers and acids) and the relative concentrations of the constituents, soft and stable pastes can be obtained at ambient temperatures.

Polyethylene Acrylic Acid Copolymer of Allied Signal, Grade 5180 -POL-4
Epolene Wax of Eastman Kodak, Grade E-43 -POL-5
LDPE of Carmel Olefines, Grade Ipethene-900 -POL-6
Inorganic Materials
Calcined MgO, a product of Grecian Magnesite grade "Normal F"—"MgF"
Glass Fibers of Owen-Corning of Diameter of 10–13 Microns and Nominal Length L=4.5 mm
Calcium Hydroxide ($Ca(OH)_2$) of Frutarom
Potassium Sulfate ($K_2SO_4$) of Frutarom

EXAMPLE 2

Production of Surface Coated $Mg(OH)_2$ Fine Powder

Surface coated $Mg(OH)_2$ fine powder was obtained in the following manner:
Raw Materials Per One Batch
100 g calcined MgO
100 g water at 50° C.
1.5 g propionic acid (FA-1)
2.0 g $MgSO_4$ brine 2.0 g solution of tall oil (FA-5)+Epolene was (POL-5) (80% (wt) and 20% (wt), respectively)

The warm water and the MgO were introduced into a beaker (cf—Example 1). The slurry was stirred and the temperature was kept at 50° C. during the test. Then, the other reagent were added simultaneously to the stirred slurry and the mixture was stirred for a total duration of 40 mins.. The slurry was then filtered off (the pH of the supernatant was in the range of 9.5–10); the solid was dried for 15 hrs. in a oven at 110° C.; the dry cake was disintegrated into a fine powder.

The fine powder was subjected to the following tests:
1. XRD revealed that the product is brucite ($Mg(OH)_2$).
2. SEM revealed hexagonal crystals of 0.5 micron (average).
3. Flotability test using Modified Halimond Tube (a well known floatability test—cf "Mineral Processing"; E. J. Pryor, Third Ed.; Elsevier Publishing Co.; 1965; pp 463–468) revealed 100% surface coated product (namely, hydrophobic brucite fine particles).

EXAMPLE 3

Production of Surface Coated Glass Fibers

Surface coated glass fibers was obtained in the following manner:
Raw Materials Per One Batch
100 g glass fibers
550 g water at 50° C.
0.5 g sodium silicate solution
2.0 g $MgSO_4$ brine
3.0 g coating solution of oleic acid (FA-5)+Epolene wax (POL-5) (80% (wt) and 20% (wt), respectively)
0.5 g calcined MgO The warm water and the glass fibers were introduced into a beaker (cf—Example 2). The sodium silicate solution and the $MgSO_4$ brine were added to the stirred mixture after 10 mins and it was stirred for an for additional 2 mins. (the pH of the mixture was then at ~9). The coating solution was added and the mixture was stirred for an additional 6 mins. The MgO was then added and the mixture was stirred for an additional 2 mins. The whole experiment was carried out at 50° C. The glass fibers were filtered off and dried in a oven at 110° C. for 15 hrs. The dry cake was subjected to a flotability test using Modified Halimond Tube (a well known floatability test—cf "Mineral Processing"; E. J. Pryor; Third Ed.; Elsevier Publishing Co.; 1965; pp 463–468) which revealed 100% surface coated product (namely, hydrophobic glass fibers).

EXAMPLE 4

Production of Surface Coated Calcium Carbonate $CaCO_3$ powder ($d_{50}$=5 microns) of Polychrom, Israel—"Girulite-10" were coated by several coating solutions as follows:

400 g calcium carbonate and 200 g water were mixed in Retch KM-1 mixer and the following materials were introduced:
1. $Ca(OH)_2$ powder until the pH reached the range of 9.0–9.5
2. 4 g $MgSO_4$ brine
3. A coating solution, as specified in Table 2:

TABLE 2

| | Weight (g) | | | | Type of Material | |
|---|---|---|---|---|---|---|
| Test # | $CaCO_3$ | Water | FA | POL | FA | POL |
| 16 | 400 | 200 | 4.0 | 1.0 | 1 | 3 |
| 17 | 400 | 200 | 4.0 | 1.0 | 2 | 4 |
| 18 | 400 | 200 | 3.0 | 1.0 | 7 | 5 |
| 19 | 400 | 200 | 3.0 | 1.0 | 5 | 5 |
| 20 | 400 | 200 | 3.0 | 1.0 | 6 | 5 |
| 21 | 400 | 200 | 30.0 | 100.0 | 8 | 6 |

The slurry was further mixed for 5 mins. The products were then filtered off and dried at 110° C. for 15 hrs. The dry products were disintegrated to powders and subjected to the Modified Hallimond Tube test (a well known floatability tests—cf "Mineral Processing"; E. J. Pryor; Third Ed.; Elsevier Publishing Co.; 1965; pp 463–468) to check the quality of coating obtained. All the sample tested were found to be 100% hydrophobic.

EXAMPLE 5

Production of Slow Release Fertilizers

Granules of slow release fertilizers were prepared in three stages as follows:
1. Mixing the fertilizers and other additives in order to produce granules in order to produce magnesite cement coated material.
2. Granulation of the above material (of stage 1) and sieving to obtain granulated fertilizers of the size of +3.5–2.0 mm.
3. Coating the granules (of stage 2) with coating solution and hardening it.

Stage 1

The first stage was conducted in a laboratory mixer—Retch type KM-1. The materials described in Table 3 and Table 4 constituted the product of this stage:

TABLE 3

| Test # | Fertilizer | | Composition |
|---|---|---|---|
| 22 | 250 g K2SO4 | + | 10 g Urea |
| 23 | 200 g KCl | + | 50 g TSP |
| 24 | 220 g MAP | + | 30 g TSP |

TABLE 4

| | Weight (g) | | | | | | | | |
|---|---|---|---|---|---|---|---|---|---|
| Test # | Fertilizer | $MgCl_2$ | $MgSO_4$ | $CaCO_3$[1] | $FeCl_3$ | $FeSO_4$[2] | $NTAH_3$ | Water | MgO |
| 22 | 260 | | 20 | 25 | | 5 | 0.6 | 5 | 25 |
| 23 | 250 | 25 | | 20 | 20 | | 0.6 | 9 | 20 |
| 24 | 250 | | 20 | 20 | | 10 | 0.6 | 10 | 25 |

Remarks:
[1]$CaCO_3$ powder ($d_{50}$ = 18 microns) of Polychrom, Israel- "Girulite-40"
[2]$FeSO_4 \cdot 7H_2O$

Stages 2 & 3

The products of the above stage were sieved and the desired granules were coated by spraying them with the suitable coating solutions in a rotating granulating pan. Thereafter, the granules were dusted with a fine powder of MgO in the granulator, where the chemical reaction with the corresponding carboxylic acid(s) led to the precipitation of the carboxylate salt(s) and the polymer onto the surface of the fertilizer. The surface of the granules became immediately hard and the products were ready for packaging. However, the magnesite cement continued to cure for additional 7 days. The coating solutions that were applied (containing 80% (wt) carboxylic acid and 20% (wt) polymer) are given in Table 5:

TABLE 5

| Test # | 100 g Granules of Fertilizer from Test # | Polymer Solution (g) | The Composition of the Coating Solution | MgO (g) |
|---|---|---|---|---|
| 25 | 22 | 8 | Tall Oil Acid + Epolene Wax | 2.0 |
| 26 | 22 | 10 | Oleic Acid + LDPE | 2.0 |
| 27 | 24 | 6 | Oleic Acid + Epolene Wax | 2.0 |
| 28 | 24 | 8 | Palmitic Acid + Epolene Wax | 2.0 |
| 29 | 25 | 8 | Tall Oil Acid + Epolene Wax | 2.0 |
| 30 | 25 | 10 | Tall Oil Acid + LDPE | 2.0 |

Third stage comprised the evaluation of the resulted fertilizers as follows: The coated and hardened fertilizers of the previous stage were immersed in water (1:10 wt ratio) at 22° C. After 5 days the water were removed from the wet fertilizers, which were then dried at 70° C. for 24 hrs. The results are given in Table 6, which contains also comparison tests of uncoated fertilizers:

TABLE 6

| Test # | Fertilizer Taken From Test # | $W_0^{(1)}$ (g) | $W_{5\ Days}^{(2)}$ (g) | % Weight Loss | Note |
|---|---|---|---|---|---|
| 31 | 22 | 20 | 15.0 | 25.0 | Reference |
| 32 | 23 | 20 | 13.0 | 35.0 | Reference |
| 33 | 24 | 20 | 14.0 | 30.0 | Reference |
| 34 | 25 | 20 | 19.8 | 1.0 | Coated Product |
| 35 | 26 | 20 | 19.5 | 2.5 | Coated Product |
| 36 | 27 | 20 | 19.0 | 5.0 | Coated Product |
| 37 | 28 | 20 | 18.5 | 7.5 | Coated Product |
| 38 | 29 | 20 | 19.0 | 5.0 | Coated Product |
| 39 | 30 | 20 | 19.0 | 5.0 | Coated Product |

Remarks:
$^{(1)}$The initial weight of the fertilizer in the test.
$^{(2)}$The weight of the dry fertilizer after 5 days in water.

EXAMPLE 6

Production of Metal Coated Polymers

Raw Materials
500 g LDPE (POL-6)
4 g coating solution (containing: 3 g tall oil acid+1 g Epolene wax)
1 g aluminum metal powder
1 g MgO powder The LDPE granules were rotated in a granulating pan. Then, the coating solution was sprayed onto the LDPE to form a thin adherent layer. Thereafter, the coated granules were dusted with the aluminum powder to form a homogenous metal coating. Eventually, the MgO fine powder was dusted on top of the granules, which caused the immediate hardening of the coated layer.

At this stage, evenly coated LDPE granules with aluminum were obtained and any attempt to wipe off the aluminum powder from the granules was futile.

All the above description and examples have been provided for the purpose of illustration and are not intended to limit the invention. Many modifications can be effected in the various procedures, processes and additives, to give a variety of surface-modified minerals, all without exceeding the scope of the invention.

I claim:

1. A process for coating a solid with a coating material, comprising the steps of:

(a) selecting the coating material from the group consisting of polymers, waxes and greases;

(b) dissolving the coating material in a solvent selected from the group consisting of carboxylic acids, carboxylic acid anhydrides and carboxylic acid halides, thereby creating a coating solution; with said coating solution and modifying said coating solution by a method selected from the group consisting of reacting said solvent with a base and dissolving said solvent in an aqueous medium, and thereby causing the formation of the coating on the solid.

2. The process according to claim 1, further comprising the step of selecting the solid from the group consisting of Al, Cu, MgO, $3MgO.4SiO_2.H_2O$, $Mg(OH)_2$, $Ca(OH)_2$, $MgCO_3$, $CaCO_3$, $CaMg(CO_3)_2$, $Al_2O_3$, $SiO_2$, $CaSO_4$, $Al(OH)_3$, glass fibers, glass platelets, glass whiskers, SiC, TiN, $KNO_3$, KCl, $(NH_4)_2SO_4$, $K_2SO_4$, $(NH_4)H_2PO_4$, $(NH_4)_2HPO_4$, urea, magnesite cements, quinacridones, oxides of Fe and oxides of Cu.

3. The process according to claim 1, wherein said modifying of said coating solution is effected by reacting said solvent with a base, thereby converting said solvent into at least one carboxylic acid salt.

4. The process according to claim 1, wherein said modifying of said coating solution is effected by dissolving said solvent in water.

5. A process for the production of a solid whose surface is coated with a coating material selected from the group consisting of polymers, waxes and greases, the process comprising the steps of:
   (a) dissolving the coating material in a solvent selected from the group consisting of carboxylic acids, carboxylic acid anhydrides and carboxylic acid halides, thereby creating a coating solution;
   (b) spreading the coating solution on the surface of the solid; and
   (c) precipitating the coating material onto the surface of the solid by a method selected from the group consisting of reacting said solvent with a base and dissolving said solvent in an aqueous medium.

6. The process according to claim 5, further comprising the step of selecting the solid from the group consisting of Al, Cu, MgO, $3MgO.4SiO_2.H_2O$, $Mg(OH)_2$, $Ca(OH)_2$, $MgCO_3$, $CaCO_3$, $CaMg(CO_3)_2$, $Al_2O_3$, $SiO_2$, $CaSO_4$, $Al(OH)_3$, glass fibers, glass platelets, glass whiskers, SiC, TiN, $KNO_3$, KCl, $(NH_4)_2SO_4$, $K_2SO_4$, $(NH_4)H_2PO_4$, $(NH_4)_2HPO_4$, urea, magnesite cements, quinacridones, oxides of Fe and oxides of Cu.

7. The process according to claim 5, further comprising the step of selecting the solid from the group of minerals consisting of $Mg(OH)_2$, MgO, $3MgO.4SiO_2.H_2O$, $CaCO_3$, $CaMg(CO_3)_2$, $MgCO_3$, $Ca(OH)_2$, $Al_2O_3$, $Al(OH)_3$, $SiO_2$, $CaSO_4$, SiC, TiN and TiC.

8. The process according to claim 5, further comprising the step of selecting the solid from the group of water soluble fertilizers consisting of $KNO_3$, KCl, $(NH_4)_2SO_4$, $K_2SO_4$, $(NH_4)H_2PO_4$, $(NH_4)_2HPO_4$, and urea.

9. The process according to claim 5, further comprising the step of selecting the solid from the group of metals consisting of Al and Cu.

10. The process according to claim 5, further comprising the step of selecting the solid from the group consisting of glass fibers, glass platelets, glass whiskers, alumina fibers, alumina platelets, alumina whiskers, MgO fibers, MgO platelets, MgO whiskers, SiC fibers, SiC platelets, SiC whiskers, TiN fibers, TiN platelets and TiN whiskers.

11. The process according to claim 5, further comprising the step of selecting the solid from the group of pigments consisting of quinacridones, mineral oxides of Fe and mineral oxides of Cu.

12. The process according to claim 5, wherein said coating material is selected from the group consisting of paraffins, long chain fatty acid esters, silicone rubbers, polyolefins, polyolefin copolymers, and grafted copolymers of polyolefins.

13. The process according to claim 5, further comprising the step of selecting the solid from the group of minerals consisting of MgO, $Mg(OH)_2$, $Al_2O_3$, $Al(OH)_3$, $CaCO_3$, $Ca(OH)_2$ and $TiO_2$.

14. The process according to claim 13, wherein the solid is selected from the group of minerals consisting of $Mg(OH)_2$, $Al(OH)_3$, $CaCO_3$ and $TiO_2$.

15. The process according to claim 14, wherein the selected solid is $Mg(OH)_2$.

16. The process according to claim 14, wherein the selected solid is $Al(OH)_3$.

17. The process according to claim 14, wherein the selected solid is $CaCO_3$.

18. The process according to claim 14, wherein the selected solid is $TiO_2$.

* * * * *

UNITED STATES PATENT AND TRADEMARK OFFICE
CERTIFICATE OF CORRECTION

PATENT NO. : 5,631,045
DATED : May 20, 1997
INVENTOR(S) : Itzhak YANIV

It is certified that error appears in the above-identified patent and that said Letters Patent is hereby corrected as shown below:

Column 12, line 32, delete the remainder of the paragraph after "a coating solution;"

Column 12, line 33, insert the following:

(c) contacting the solid with said coating solution; and (d) modifying said coating solution by a method selected from the group consisting of reacting said solvent with a base and dissolving said solvent in an aqueous solution.

Signed and Sealed this

Seventeenth Day of March, 1998

Attest:

BRUCE LEHMAN

Attesting Officer

Commissioner of Patents and Trademarks